United States Patent [19]

Schweizer et al.

[11] Patent Number: 5,668,655
[45] Date of Patent: Sep. 16, 1997

[54] TILT MIRROR ARRANGEMENT

[75] Inventors: Jürgen Schweizer, Westerhofen; Reinhard Ludewig, Heidenheim, both of Germany

[73] Assignee: Carl-Zeiss-Stiftung, Heidenheim-Brenz, Germany

[21] Appl. No.: 598,703

[22] Filed: Feb. 8, 1996

[30] Foreign Application Priority Data

Feb. 11, 1995 [DE] Germany ............... 195 04 568.8

[51] Int. Cl.⁶ .................... G02B 26/08; G02B 7/182
[52] U.S. Cl. ............... 359/198; 359/200; 359/223; 359/225; 359/872
[58] Field of Search .................... 359/196–198, 359/200, 201, 212–214, 223, 225, 872, 875; 310/152; 384/110; 250/206.1, 206.2, 234

[56] References Cited

U.S. PATENT DOCUMENTS

| | | |
|---|---|---|
| 4,175,832 | 11/1979 | Umeki et al. .............. 359/225 |
| 4,383,763 | 5/1983 | Hutchings et al. . |
| 4,660,941 | 4/1987 | Hattori et al. . |
| 4,691,212 | 9/1987 | Solcz et al. . |
| 4,708,420 | 11/1987 | Liddiard . |
| 5,170,277 | 12/1992 | Bard et al. . |
| 5,293,265 | 3/1994 | Aleshin et al. ............ 359/225 |

FOREIGN PATENT DOCUMENTS

0656554  6/1995  European Pat. Off. .

*Primary Examiner*—James Phan
*Attorney, Agent, or Firm*—Walter Ottesen

[57] ABSTRACT

The invention relates to a tilt mirror arrangement which has at least one tilt mirror, a base and at least one mirror bearing having at least a virtually fixed pivot point between the tilt mirror and the base. The mirror surface is characterized by a length of less than 40 mm and the size of the entire arrangement of the tilt mirror, bearing and housing is arranged below the mirror surface so that the arrangement does not extend beyond the projection of the mirror plane or extends only insignificantly when the mirror tilts.

25 Claims, 5 Drawing Sheets

TILT MIRROR ARRANGEMENT

FIELD OF THE INVENTION

The invention relates to a tilt mirror arrangement which has at least one tilt mirror, a base and at least one mirror bearing. The mirror bearing has at least one pivot point between the tilt mirror and the base and this pivot point is virtually fixed.

BACKGROUND OF THE INVENTION

Tilt mirror arrangements of this kind are known from the state of the art. The purpose of these tilt mirror arrangements is to reflect light incident thereon at a certain angle. In this context, one-axis tilt mirrors are distinguished from two-axis tilt mirrors.

One-axis tilt mirrors are today widely available in the marketplace and have large technical variations. On the other hand, two-axis tilt mirrors are likewise state of the art today and can be obtained in the marketplace but are subjected to significant technical limitations. These limitations are especially:

(a) limited tilt angle about the x-axis and y-axis which usually is an angle of less than 1°;

(b) limited size with respect to which it is noted that certain tilt angles require a certain minimum size or also a maximum size which can, in each case, be disturbing;

(c) the size of the tilt mirror arrangement is significantly greater than the mirror surface and this is especially the case behind the mirror surface for small tilt mirrors (that is, no high packing densities can be obtained with the mirrors of the state of the art); or, (d) complicated manufacturing techniques of known two-axis tilt mirrors.

U.S. Pat. No. 4,708,420 discloses a tilt mirror arrangement which is used for scanning. The scan mirror is connected via flexure members to piezoceramic drive elements which are arranged parallel to the mirror surface. This arrangement must be very large so that the piezoceramic drive elements can tilt the mirror through a large angle. This results from the low deformation of the piezoceramic drive elements which is proportional to the length of these elements. Accordingly, this arrangement is not suitable to tilt small mirrors through a large angular range when the drive mechanism behind the tilt mirror is intended to be limited to the dimension of the mirror surface.

U.S. Pat. No. 4,383,763 discloses a tilt mirror arrangement wherein the mirror is journalled on a tilt bearing and is moved via piezoelectric ceramics. Here too, the dimensions of the mirror must be very large if the tilt mirror is to be tilted by at least 1°.

U.S. Pat. No. 4,660,941 discloses a tilt mirror mount wherein the tilt mirror movement is obtained by piezoelectric elements and the piezoelectric elements operate via levers on the mirror. Here too, the arrangement is not suitable to tilt a small mirror by about at least 1°.

U.S. Pat. No. 5,170,277 discloses a piezoelectric beam deflector wherein the mirror is attached directly to the piezoelectric element. This has the disadvantage that the mirror has no defined pivot point when tilting.

U.S. Pat. No. 4,691,212 discloses a piezoelectric beam reflector which is used in a scanning arrangement. The disadvantage of this arrangement is that a specific deflecting angle cannot be rigidly maintained when the pivot point is intended to be fixed.

SUMMARY OF THE INVENTION

It is an object of the invention to provide a tilt mirror arrangement wherein the mirror has a pivot point which is virtually fixed and which makes an assembly possible wherein the base body supporting the mirror is not greater than the mirror surface notwithstanding a relatively large tilt angle (>0.5°).

The tilt mirror arrangement of the invention includes: a base defining a longitudinal axis; a tilt mirror unit having a mirror defining a mirror surface having a length of less than 40 mm; a bearing defining at least an almost fixed pivot point between the tilt mirror unit and the base for pivotally mounting the tilt mirror unit on the base; the mirror surface defining a mirror plane projected along the axis; and, the tilt mirror unit, the bearing and the base conjointly defining an assembly which does not extend outwardly beyond the projection or only insignificantly when the mirror is tilted.

The special advantage of the invention is that the tilt mirror according to the invention has an assembly wherein the base, which supports the mirror, is not greater than the mirror surface.

The tilt angle θ can nonetheless be relatively large (θ>0.5°). The tilt angle θ advantageously lies in the range between 1°<θ<5°.

A pivot point which is at least almost fixed is obtained with the mirror bearing which is self centering with reference to the pivot point.

The mirror bearing should, in addition, be of low friction so that the tilt mirror can be easily adjusted and can be easily moved out of one position into another desired position.

The invention permits the construction of a tilt mirror arrangement wherein the mirror diagonal and the base diagonal is less than 4 cm. In addition, it is possible to realize a tilt angle θ greater than 0.5°. Tilt angles of 5° to 10° can also be realized with the invention, even for assembly sizes of less than 10 mm edge length.

It is advantageous to provide a restraining device between the point at which force is applied and the base in order to permit every possible position of the tilt mirror arrangement in space.

In the simplest case, this restraining device is configured as a spring.

Forces act on the tilt mirror for an inclined position of the tilt mirror arrangement in space. Depending upon the angle of inclination of the tilt mirror arrangement, these forces move the mirror out of its base position. For at least one predetermined preferred inclined position of the tilt mirror arrangement, a weight-balancing device for the tilt mirror can be introduced or act thereupon if the inclination of the tilt angle arrangement during use of the tilt mirror is known.

In an advantageous manner, a force-generating device with changeable force effect is mounted in the tilt mirror arrangement. This force-generating device can be driven externally and effect a change of the tilt angle θ. In this way, a high dynamic of the tilt angle and very short reaction times are obtained.

It is advantageous if an extension is provided at the lower side of the tilt mirror on which the force-generating device can act with changing force by a pull and/or push to displace the tilt mirror. Depending upon the length of the extension, another transfer or translation of the acting force is obtained. This translation is in accordance with the law of levers and can be used to dimension the particular tilt mirror depending upon the required accuracy of adjustment.

At least one point or one surface on the extension should be orientated perpendicularly to the tilt axis. This point or this surface can then be used as a force-application point or force-application surface. This makes possible a symmetrical assembly of the force-generating device.

It is advantageous to arrange at least one force-generating device laterally in order to provide a compact configuration of the tilt mirror arrangement. In this way, the center remains free and can be used to realize other functions.

The force-generating device can advantageously be configured as a body bending perpendicularly to the tilt axis. The bending body is attached fixedly at its lower end to the base and the force-generating device has a mechanical coupling between the bending body and the tilt mirror. This makes possible a compact realization of the force-generating device which economizes greatly on space.

If the coupling device is configured as a relatively rigid body, then a push force as well as a pull force can be applied to the tilt mirror by means of the force-generating device.

The force-generating device is advantageously realized by bending piezoactuators or strip piezoactuators. For a low expansion of the body, these piezoactuators generate an adequate force to displace the tilt mirror without it being necessary to provide a large amount of space in the tilt mirror arrangement for the movement of the mirror.

The force-generating device can however also be at least one device having a changeable magnetic field intensity which can apply a force to a magnet connected rigidly to the tilt mirror.

At least one detector can be mounted off-axis with respect to the tilt axis below the lower side of the tilt mirror in order to determine the position of the tilt mirror relative to the base. The measurement values of the detector are dependent on the position of the tilt mirror relative to the base and therefore to the detector. In this way, the movement of the tilt mirror in one axis can be detected. If two detectors mounted off-axis with respect to the tilt axis are used, then the position of a two-axis tilt mirror relative to the base can be determined.

The tilt mirror arrangement can be especially advantageously arranged in an array. The tilt mirror arrangements can be placed very close to each other because of the constructional configuration of each arrangement.

The array is advantageously so configured that a further like array can be placed adjacent thereto on all sides. For the irradiation of a large surface, this affords the advantage that the surface to be irradiated can be processed in subsurfaces.

The array of tilt mirror arrangements can be disposed in a hexagonal pattern in order to obtain the close configuration which is sometimes desired. This makes it possible to arrange a great many mirrors within a circle or to configure a surface which can be placed seamlessly next to a correspondingly formed surface on a plane.

A leg is advantageously mounted on the base and a holding part of the leg projects to below the center of the lower side of the tilt mirror. A conically-shaped opening having an aperture angle β or a spherically-shaped aperture can be provided on the upper side of the holding part. This opening functions as a self-centering device for the lower portion of the tilt mirror. The self-centering device can, for example, include a cone directed downwardly having an apex angle α or a semisphere.

If the lower portion of the mirror is configured as a cone having an apex angle α and the opening has a conical shape defining an aperture angle β, then the value of the angle β must be greater than the value of the angle α so that the movement of the cone can take place undisturbed in the opening.

BRIEF DESCRIPTION OF THE DRAWINGS

The invention will now be described with reference to the drawings wherein:

FIG. 6a is a side elevation view, partially in section, of a fourth embodiment of the tilt mirror arrangement of the invention equipped with another force-generating device; and, FIG. 6b is a section view taken along line VIb—VIb of FIG. 6a.

DESCRIPTION OF THE PREFERRED EMBODIMENTS OF THE INVENTION

Figure 1:
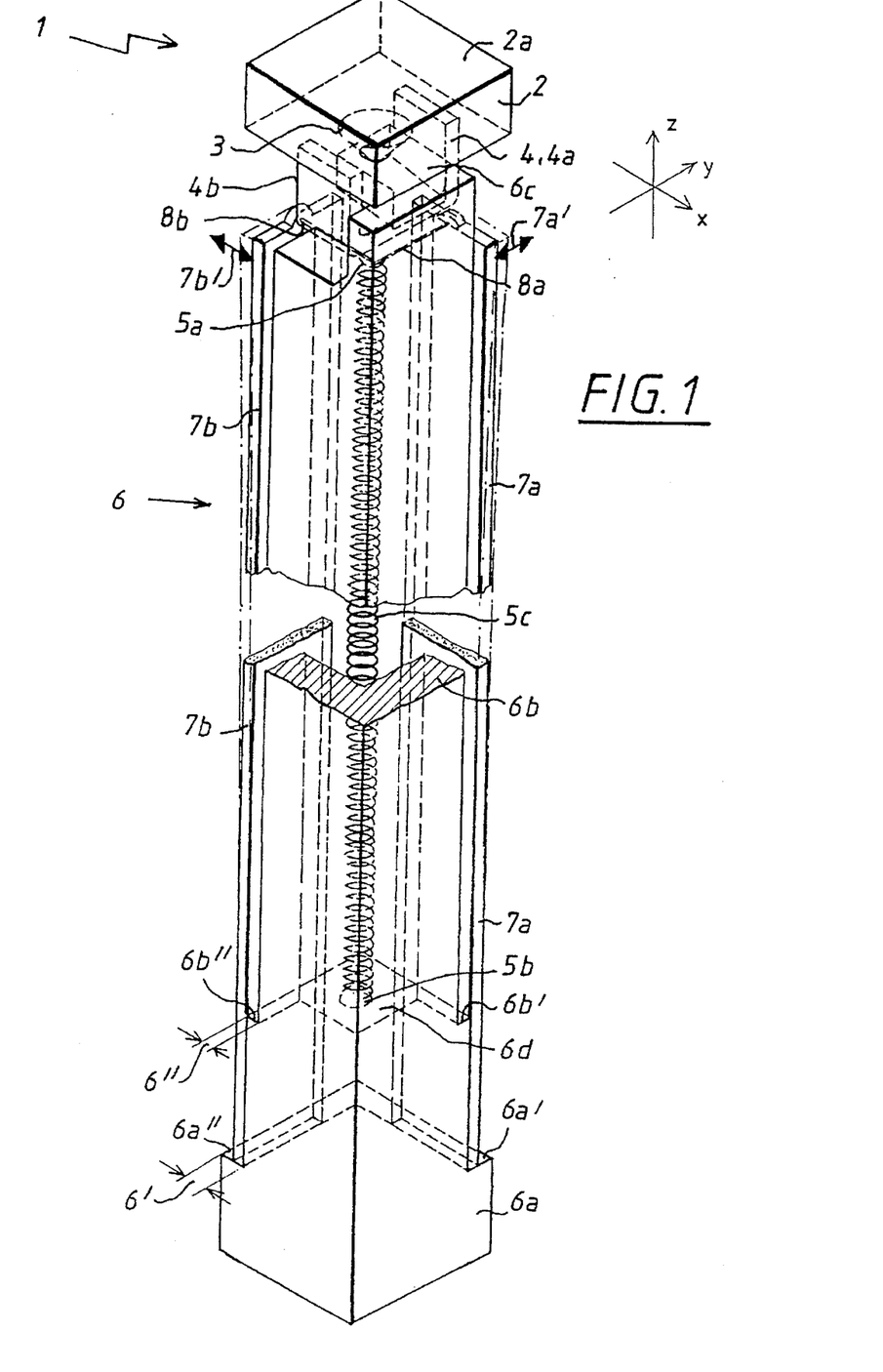
FIG. 1 is a perspective view of a first embodiment of the tilt mirror arrangement of the invention.
Figure 2A:
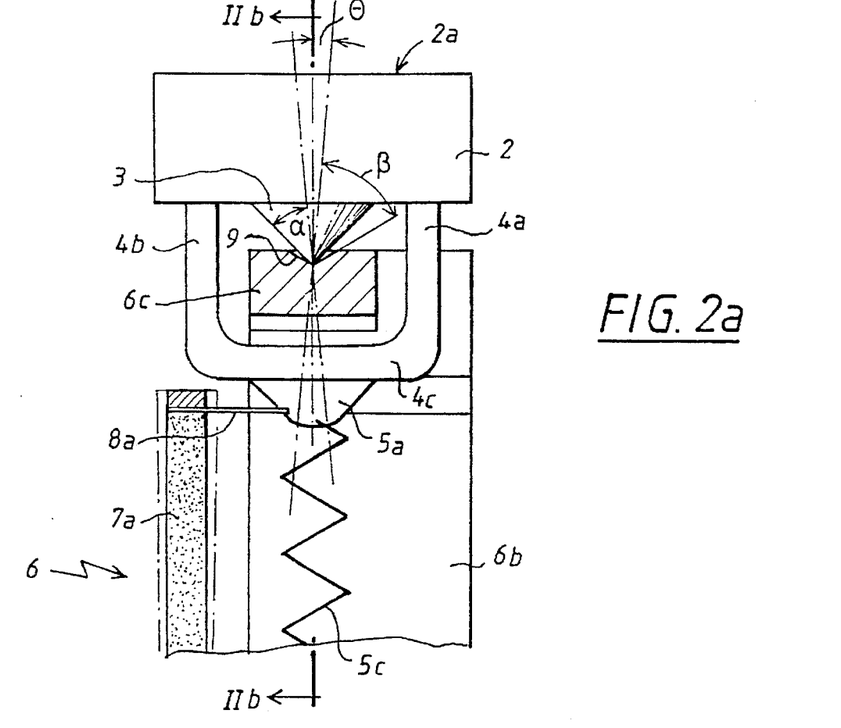
FIG. 2a is a section view in the YZ-plane taken through the mirror bearing of the tilt mirror arrangement of FIG. 1.
Figure 2B:
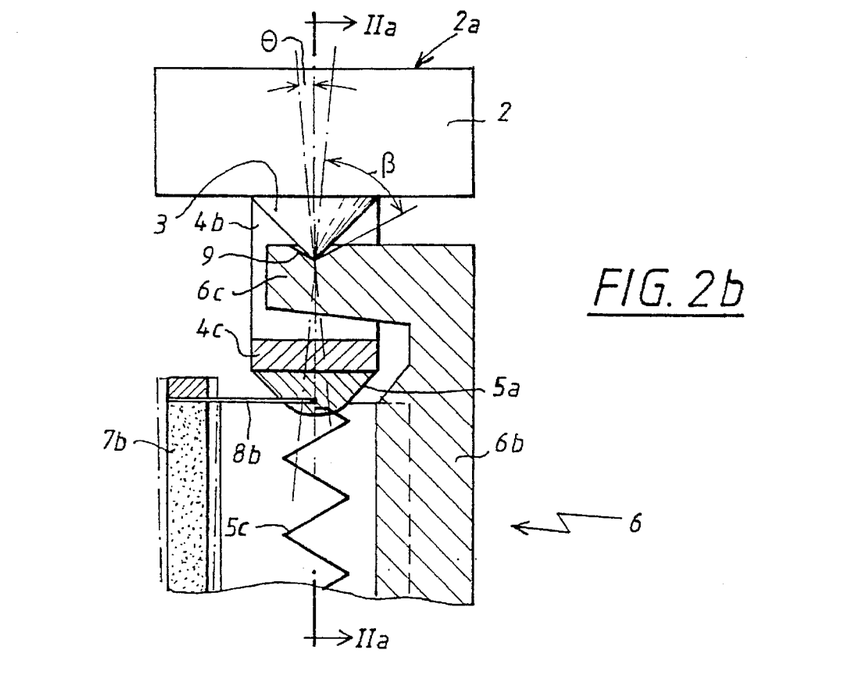
FIG. 2b is a section view in the XZ-plane through the mirror bearing of the tilt mirror arrangement of FIG. 1.

The tilt mirror arrangement 1 shown in FIGS. 1, 2a and 2b includes a tilt mirror 2 having a mirrored surface 2a. The tilt mirror 2 has a circular cone 3 on the lower side thereof. The circular cone 3 is directed downwardly and has an apex angle α with the tip of the angle directed toward the upper base 6.

Two side legs (4a, 4b) are arranged laterally of the circular cone 3 and a base leg 4c connects the two side legs with each other. A holder 5a is disposed below the base leg 4c and can be integrated with the holder or mounted thereupon. The three legs (4a to 4c) are so dimensioned that they surround part 6c of the base 6 with an adequately large clear space. The part 6c projects into the center. This clear space is necessary so that the mirror 2 can carry out its movements. The two legs (4a, 4b) can be produced by a slitted tubular sleeve.

The rounded tip of the circular cone 3 lies in a rounded conically-shaped opening 9 having an aperture angle β. This conically-shaped opening 9 is disposed on the upper side of part 6c of the base 6. The angle β of the opening 9 is greater than the angle α of the circular cone 3 so that a free movement of the circular cone 3 in the opening 9 can take place in the entire desired angular range θ of the mirror 2.

In this way, the tilt mirror 2 has a bearing with three rotational degrees of freedom. The tip of the circular cone 3 and the tip of the conically-shaped opening 9 have well defined radii in such a manner that a strictly rolloff movement of the circular cone 3 on the opening 9 occurs with a rotation of the tilt mirror 2 about the x and y axes.

This type of bearing is point-shaped, self-centering and unstable and clearly fixes the pivot point of the tilt mirror 2. The bearing permits tilt angles of ±5° and more. Suitable materials for the lubricant-free bearing are, for example, glass, sapphire, diamond, boron-nitride hardened steel, et cetera for the rounded base of the conically-shaped opening 9 or for the rounded tip of the circular cone 3.

The part 6c of the base 6 projects into the center thereof and is supported laterally by an L-shaped carrier 6b. The carrier 6b is connected to a base portion 6a.

The lower base portion 6a has two lateral recesses (6a' and 6a") in the lower part thereof. Two further lateral recesses (6b' and 6b") are arranged further up on the lower base portion 6a. The base 6 defines a flat plateau surface 6d at the elevation of the two lateral recesses (6b' and 6b"). A lower holder 5b is provided on the plateau surface 6d.

A first strip piezoactuator 7a is attached to the lateral surface between the two recesses (6a' and 6a") and a second piezoactuator 7b is attached to the lateral surface between the two recesses (6b' and 6b"). These strip piezoactuators (7a, 7b) are also referred to as bending piezoactuators. All known elongated components which can be bent in a controlled manner are suitable for realizing this configuration. The control of the bending is external.

The strip piezoactuator 7a lies with its lower end directly on the base 6 and on a surface 6' of the recess 6a' and strip piezoactuator 7b lies with its lower end directly on the base 6 and on a surface 6' of the recess 6a". For each piezoactuator, a certain spacing remains to the edge of the base 6. A corresponding spacing 6" of the strip piezoactuators (7a, 7b) is also present between the L-shaped carrier 6b of base 6 and the piezoactuators.

These spacings are necessary so that the strip piezoactuators (7a, 7b) can bend when a voltage is applied without going beyond the surface of the base 6. In this way, it is assured that the maximum necessary width is provided by the base surface of the base 6. This width is only insignificantly greater than the mirror surface 2a (for a 5° inclination, approximately 5%).

The strip piezoactuators (7a, 7b) are attached on the two sides of the base 6 up to the elevation of the holder 5b (for example, with adhesive, solder, et cetera); that is, for piezoactuator 7a, between the two recesses 6a' and 6b' and for the piezoactuator 7b, between the two recesses 6a" and 6b". The strip piezoactuators (7a, 7b) are each connected by means of thin connecting elements (8a or 8b) to the upper holder 5a. The connecting elements (8a, 8b) allow in this example a pull force as well as a push force; that is, the connecting elements must exhibit a certain stiffness (for example, steel wire having a certain diameter or larger and up to a certain length).

A spring 5c is disposed between the two holders (5a and 5b) and functions as a restraining device for the tilt mirror 2.

If an electric voltage is now applied to one of the two strip piezoactuators 7a, then this piezoactuator bends in a direction 7a' in dependence upon the sign of the voltage (in a manner similar to a bimetal strip when heated). The upper holder 5a is moved in a direction 7a' via the force coupling 8a and this leads to a movement of the tilt mirror 2. The deflection of the strip piezoactuators (7a, 7b) is approximately proportional to the applied electrical voltage so that a controlled movement of the tilt mirror 2 about the x and/or y axis is obtained by a variation of the applied voltage on one or both actuators (7a, 7b). On the other hand, if the voltage is not changed, then the mirror 2 remains in the desired position (provided the voltage drift is compensated).

If an opposite voltage is applied to the strip piezoactuator 7a, then it moves opposite to the above-mentioned direction 7a' and thereby moves the upper holder 5a and therefore the tilt mirror 2.

In this way, a movement of the tilt mirror 2 on an axis through the angle θ is possible. A movement of the tilt mirror 2 on an axis (direction 7b') perpendicular thereto is possible by means of the second piezoactuator 7b.

In this way, a tilt mirror arrangement 1 having a bearing and a force-generating device (7a, 7b) is realized in which a mirror body 2 can be moved in two axes perpendicular to each other. The value of the angle θ can be between a few angular seconds and ±10°.

When dimensioning the circular cone 3 or the conically-shaped opening 9, it is very advantageous when the angle β is greater than the angle α so that the movement of the mirror 2 is not disturbed by the opening 9. Furthermore, it is very advantageous when the conical tip of the circular cone 3 is rounded and when the base of the spherically-shaped opening 9 also has a ball-socket form so that a rolloff movement of the conical tip on the base of the opening is provided and so that the conical tip does not bore into the surface of the opening with use of the mirror 2.

The special advantages of the arrangement shown in FIG. 1 are seen in that the assembly size of the arrangement in the mirror plane and therebehind is not or only insignificantly greater than the mirror surface 2a. Also, the two-axis tilt mirror arrangement 1 has a small mirror surface 2a having an edge length less than 40 mm but greater than 3 mm.

The tilt mirror arrangement is distinguished also by a relatively large tilt angle of at least approximately ±5° about each axis. The compact construction of the tilt mirror arrangement permits many of the same type of tilt mirror arrangements to be built up together to define a segmented large surface or conical mirror which can be produced cost effectively in large numbers.

Figure 3:
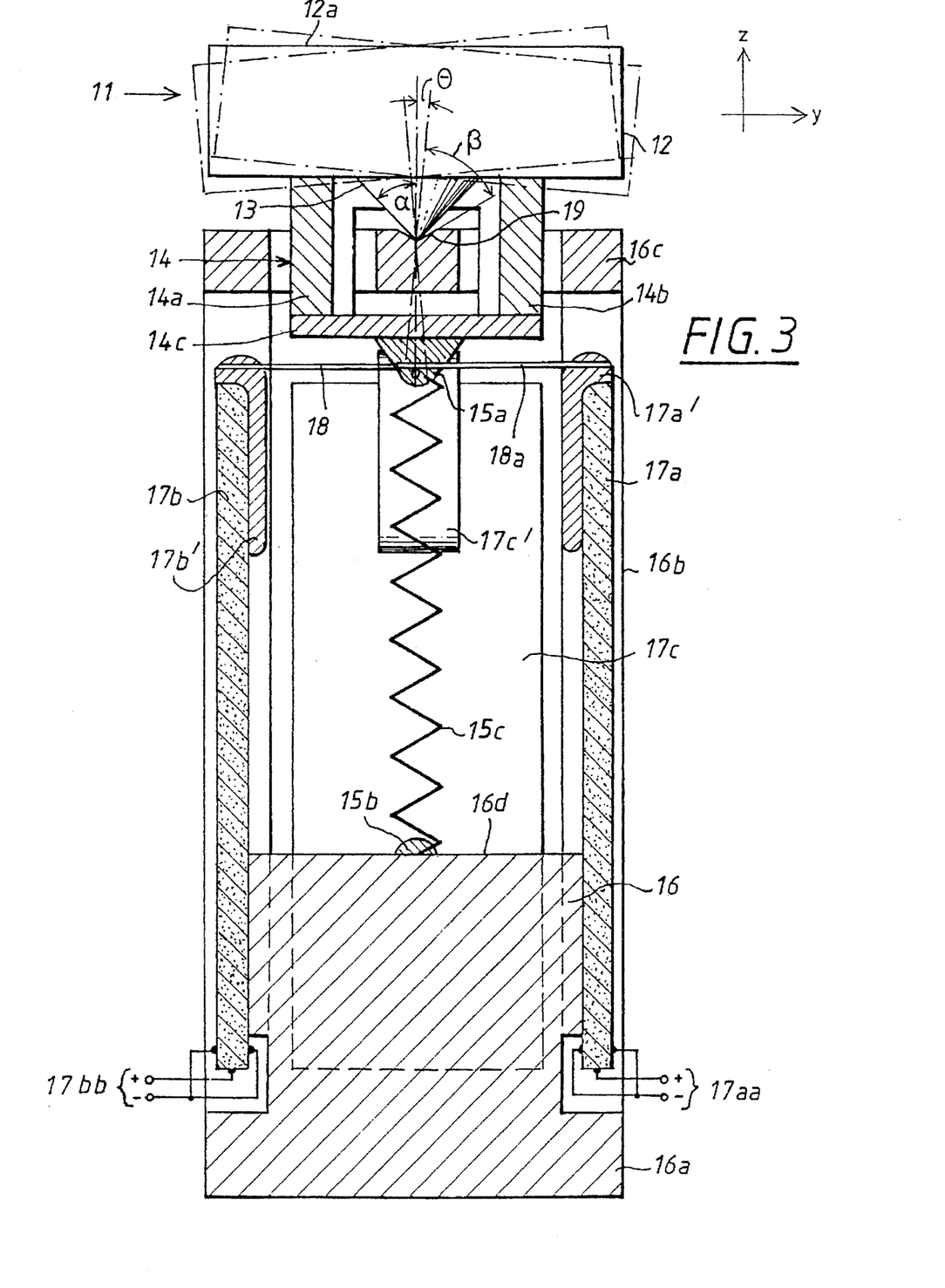
FIG. 3 is a lateral section view of a second embodiment of the tilt mirror arrangement of the invention.
Figure 4:
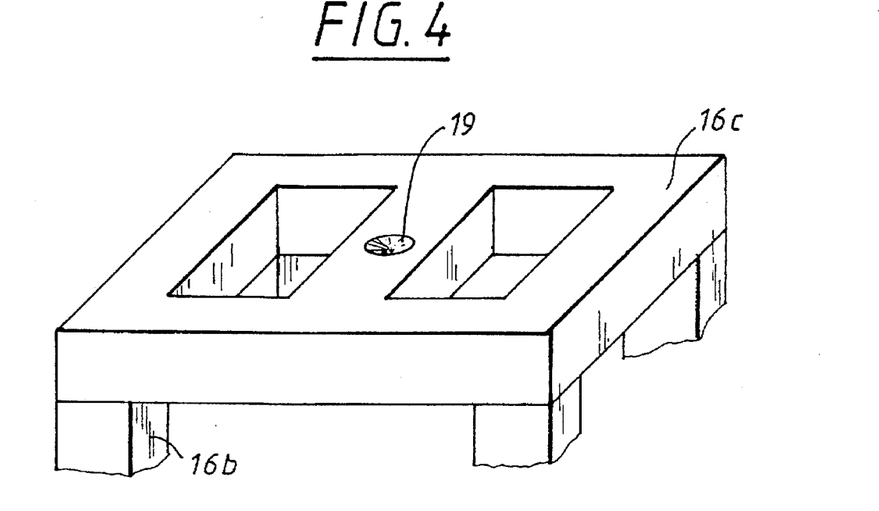
FIG. 4 is a perspective view of the upper base body of the embodiment of FIG. 3 as seen from the mirror end.

A second embodiment of the tilt mirror arrangement 11 is presented in FIGS. 3 and 4. This embodiment is similar to that shown in FIGS. 1, 2a and 2b.

Here too, the tilt mirror 12 has a mirrored surface 12a on the one side thereof and a circular cone 13 having an apex angle α on the other side thereof. Two legs (14a, 14b) are provided about the circular cone 13. The two legs (14a, 14b) are connected to each other by a third leg 14c. An upper holder 15a is provided on the lower side of the third leg 14c. The three legs (14a to 14c) define thereby a U-shaped body 14 on which the force-generating device operates and produces a movement of the tilt mirror 12 in accordance with the law of levers.

The rounded tip of the circular cone 13 is disposed in a conically-shaped opening 19 having an opening angle β. This opening angle β is greater than the angle α and the lower end of the conically-shaped opening is rounded. The conically-shaped opening is disposed on the upper side of the upper base portion 16c as shown again in detail in FIG. 4. The mirror bearing shown in FIG. 4 corresponds to the mirror bearing shown in FIGS. 1a, 2a and 2b so that reference is made here to the above description.

Four thin connecting elements are connected to the upper holder 15a of which only two are shown, namely elements (18a, 18b). The connecting elements (18a, 18b) are connected by solder locations (17a', 17b') to respective strip piezoactuators (17a, 17b). The other two solder locations and the other two strip piezoactuators are not shown. In this embodiment, the connecting elements (18a, 19b) and the two connecting elements not shown must only transmit a pull force because four strip piezoactuators are provided, that is, two actuators for each axis. The connecting elements can therefore be made of elastic material such as steel wire up to a certain diameter and up to a certain length. The connecting elements can also be rigid.

These strip piezoactuators (17a, 17b) are connected fixedly at their lower ends thereof to a base body 16a and function to move the tilt mirror 12 about one axis by an angle θ. Two further strip piezoactuators (17c and 17d) (not shown in FIG. 4) are each disposed at 90° with respect to the piezoactuators (17a and 17b). The two additional piezoactuators (not shown) are also connected by connecting elements to the holder 15a. The tilt mirror 12 is spatially fixed by the four connecting elements of which only 18a and 18b are shown.

In addition, a tension spring 15c is connected to the upper holder 15a and, its other end, to a lower holder 15b. The holder 15b is provided on the surface 16b of the lower base portion 16a. The spring 15c functions as a restraining device. The spring 15c further fixes the tilt mirror 12 so that the mirror 12 can also stand on end, that is, so that it can be moved into any desired spatial orientation.

In FIG. 3, the electrical connections (17aa, 17bb) of the two strip piezoactuators (17a, 17b) are shown. The electrical connections for the other two piezoactuators are disposed at 90° with respect to connections (17aa, 17bb) and therefore are not shown in FIG. 3.

The upper base portion 16c of base 16 is shown in FIG. 4 and is made from a square piece in which two rectangularly-shaped cutouts are machined. A conically-shaped opening 19 is formed in a center strut which extends between the two cutouts.

Four base supports 16b reliably mount the upper base portion 16c on the lower base portion 16a.

Figure 5:
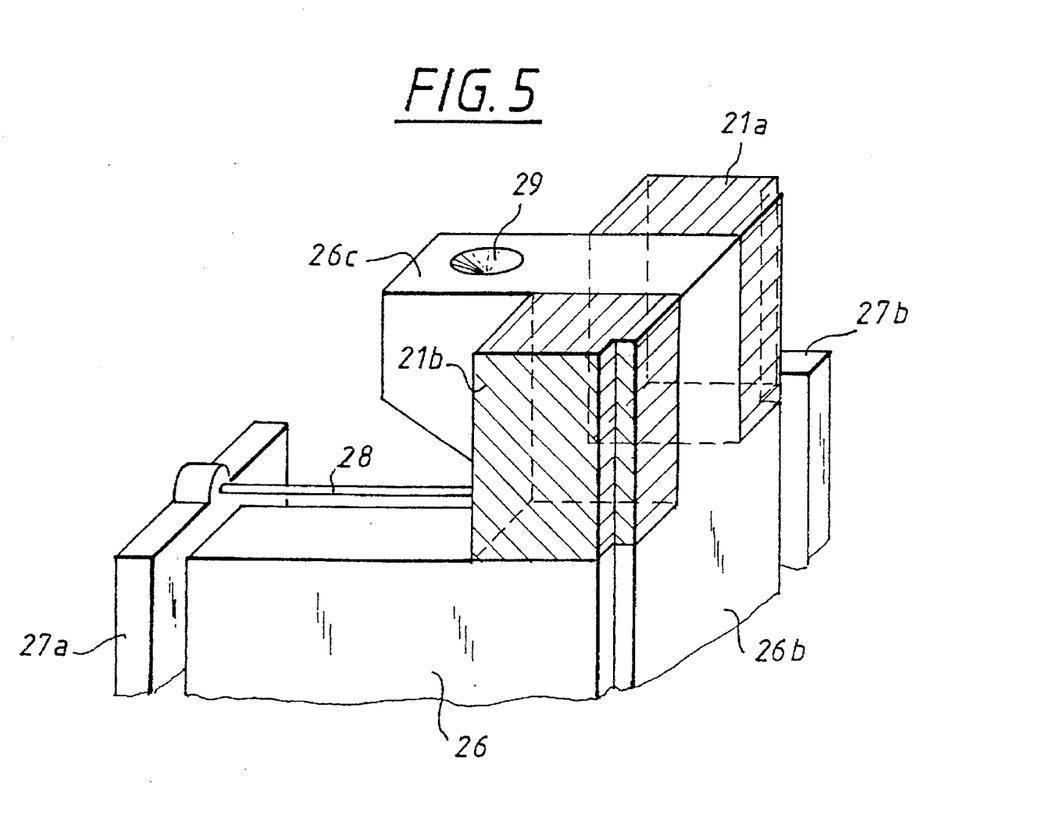
FIG. 5 is a perspective view of the upper base body according to a third embodiment of the tilt mirror arrangement of FIG. 3 equipped with position sensors.

A third variation of the base is shown in FIG. 5 wherein the base is identified by reference numeral 26. This base has at least two tilt position detectors (21a, 21b) mounted on the upper side thereof (for example, proximity sensors).

The following elements have already been described with respect to the previous figures: force-generating devices (27a, 27b), the conically-shaped opening 29, the part 26c of the base 26 which projects into the center and the connecting elements 28. Furthermore, the position of the tilt mirror on the mirror bearing has been explained in detail above and is not shown here for reasons of clarity. The arrangement is essentially built up in the same way as the arrangement shown in FIGS. 1, 2a and 2b. The difference is here that the instantaneous position of the tilt mirror is determined by position detectors on the base 26.

This affords the advantage that the spatial position of the mirrored surface of the tilt mirror can be detected in relationship to the base 26 and a control loop can be used in order to permit the mirror to assume a desired spatial position. The control loop is known per se.

For the controlled tilt mirror, the input of a desired movement takes place in a control computer which generates a control voltage. This control voltage reaches the strip piezoactuators and the movement thereof is transmitted to the tilt mirror. The tilt position detectors detect this tilt movement and generate a measurement voltage which reaches the control computer. The control computer then computes a corrective voltage from the comparison of the desired and actual values. The control voltage is corrected with this corrective voltage.

With the invention, it is possible to provide a position controlled two-axis tilt mirror arrangement which has the following attributes:

(a) the constructional size in the xy direction is not greater than the mirror plate (this mirror plate can be less than 10 mm);

(b) the manufacture thereof is simple;

(c) manufacture is relatively economical; and, (d) a tilt angle of ±5° and more is provided.

The pivot point is relatively close to the surface of the mirror whereby the lateral migration of the tilt mirror during tilting can be held to be very small (for example, for the tilt mirror shown in FIG. 3, the lateral migration for a 5° tilt angle is maximum of 5% of a base side length). The position of the mirror pivot point is then dependent upon the thickness of the tilt mirror and the dimensioning of the struts under the tilt mirror.

Figure 6A:
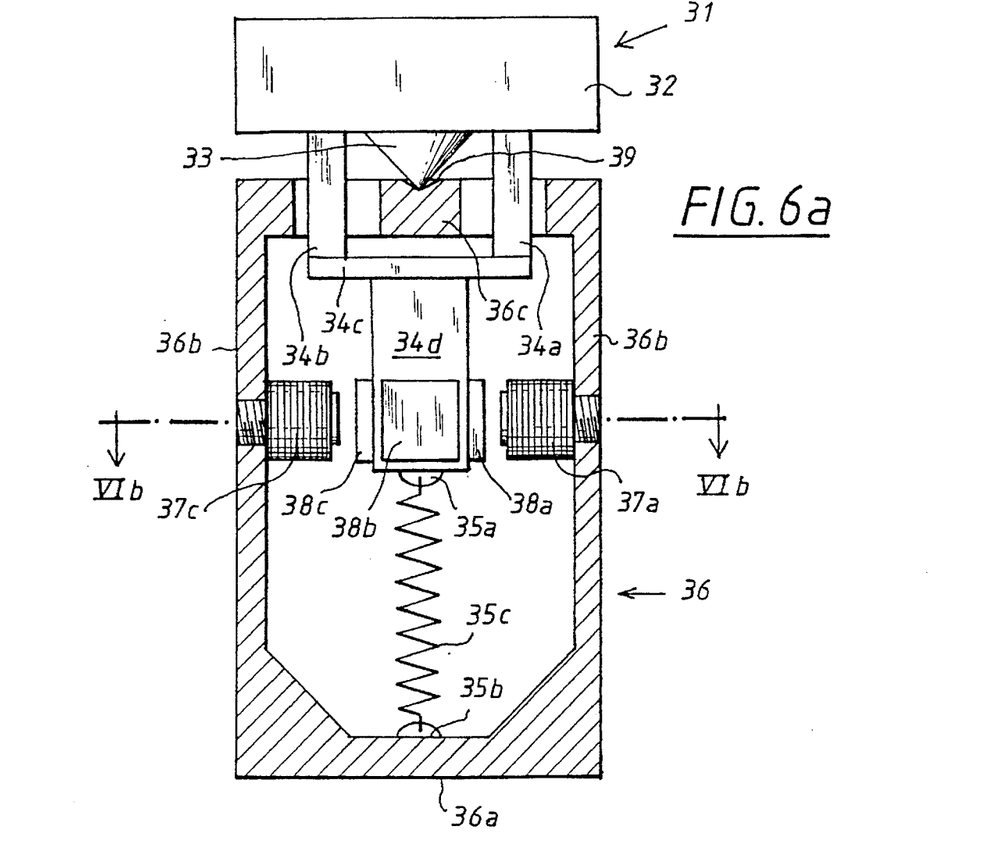
Figure 6B:
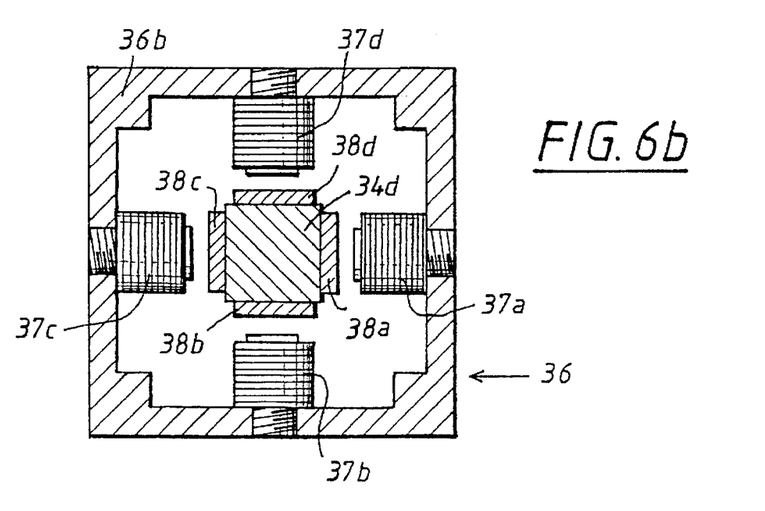

The fourth version of the tilt mirror arrangement 31 is shown in FIGS. 6a and 6b and does not include strip piezoactuators as drive elements or force-generating devices.

The tilt mirror 32 again has a circular cone 33 at its lower side. Two legs (34a, 34b) are arranged laterally of the circular cone 33 and are connected to each other by a third leg 34c. Thus far, this embodiment corresponds to the other embodiments.

A further holder 34d is provided below the leg 34c. Four permanent magnets (38a to 38d) are mounted on the holder 34d so that each two of the magnets are mounted on opposite sides of the holder. An upper holder 35a is provided on the lower end of holder 34d and the upper end of a spring 35c is connected to the upper holder 35a. The lower end of the spring 35c is connected to a lower holder 35b which is disposed on a surface of the base 36. The base body 36 includes four lateral struts 36b. Four coils 37a to 37d are provided with one coil being arranged between each two mutually adjacent ones of the struts 36b. The coils 37a to 37d are at an elevation corresponding to that of the permanent magnets 38a to 38d.

If, for example, a current is allowed to pass through coil 37a, then the coil 37a functions so that the permanent magnet 38a is repelled away from the coil 37a. In this way, the tilt mirror 32 is moved. The tilt mirror 32 moves in different tilt directions depending upon how the coils 37a to 37d are supplied with more or less current.

The struts 36b arranged in the corners of the base body 36 support the strut 36c with the conically-shaped opening 39 for journalling the circular cone 33 of the tilt mirror 32. The strut 36c projects into the center of the base 36.

If the tilt angle detectors are omitted, then a control loop can also be provided in that the position of the reflected beam is detected. This can, for example, be provided by a beam splitter which is mounted behind the tilt mirror arrangement and which deflects a portion of the incident radiation onto an optical measuring arrangement such as a surface detector array. When a deviation of the actual value from the desired value is obtained, then the optical measuring arrangement transmits a signal for driving the tilt mirror arrangement 31 until the tilt mirror 32 assumes the desired position.

The sensors which can be built in and are here usable for detecting the tilt angle in the embodiment of FIG. 5 can, for example, be obtained from the following sources:

(a) Kaman Instrumentation Measuring Systems, 1500 Garden of the Gods Road, Coloroda Springs, Colo. 80907 with the sensors being identified as Displacement Measuring Systems KD-2300-.5SU and/or other sensors from the production series KD-2300/2310/2350; or, (b) Micro-Epsilon Messtechnik GmbH & Co. KG, K̈onigbacher Strasse 15, 8359 Ortenburg-Dorfbach, Germany, under product number U05.08, U05.10 and/or U05.12.

The strip piezoactuators of FIGS. 1 to 5 can, for example, be obtained from Hoechst CeramTec of Germany and are identified as monolithic multilayer actuators or also as piezoelectric bending elements.

The invention is not limited to a point bearing of the tilt mirror on a base body. What is important only is that the journalling is as friction free as possible and that no jolt-like movements take place when initiating a movement.

It is also possible to configure journalling of the tilt mirror on a base such that the tilt mirror body has a spherical section facing toward the base which is supported on a correspondingly formed hollow spherical section on the base. If the two spherical sections are made of a magnetic material wherein repelling magnetic poles (that is, north to north or south to south) lie opposite each other, then a "floating", that is a fully friction free journalling of the tilt mirror body on the base body is obtained. To ensure that angular displacement forces reach the tilt mirror body, one or more openings can be provided, for example, in the base below the tilt mirror body by means of which one or more displacement elements of a force-generating device engage the tilt mirror body.

The journalling of the tilt mirror body can also comprise a solid body articulated joint between the tilt mirror body and the base. The solid body articulated joint must be so configured that it permits tilt movements of the tilt mirror in two axes in the same manner (for example, a round rod which is correspondingly tapered at the pivot point of the tilt mirror).

Many other bearings for carrying out the invention are possible. What is important is that the mirror bearing be free of friction or at least of very low friction.

The force-generating device can comprise bending or strip piezoactuators or comprise coils and magnets. All devices generating a force are suitable as a force-generating device and which have a correspondingly compact configuration and for which the force generation leads to a movement (for example, electrical linear motors, gas actuated pistons, liquid actuated pistons or other types of pistons and the like).

The restraining device can be a spring or another element which can ensure that the tilt mirror does not displace itself from the base in any inclined position in an uncontrolled manner. For example, restraining devices are conceivable by means of which the restraining force is generated by fields such as magnetic fields.

A weight-balancing device about the pivot point is advantageous when the tilt mirror arrangement is to be operated in a defined inclined position. The weight-balancing device ensures that the weight forces which occur and which bring the tilt mirror out of its rest position are compensated for and must not be taken up by the force-generating device. This weight-balancing device can be realized in the embodiment of FIG. 6 in that one or two coils are provided with a permanent bias voltage in dependence upon the relative position of the tilt mirror arrangement.

As tilt position detectors, not only those detectors can be used which carry out a distance measurement. Depending upon the specific configuration of the invention in a specific tilt mirror arrangement, also those sensors can be used for detecting position which detect a field emanating from the tilt mirror (for example a magnetic field) wherein the field intensity is dependent upon the tilt angle.

Any spatial array can be used as an array for arranging several tilt mirror arrangements next to each other. The arrays which can be used are those which are necessary for the apparatus in which the tilt mirror arrangement is finally utilized. The mirror surfaces must not necessarily lie one next to the other; instead, they can be displaced perpendicularly to the mirror plane.

The base must not necessarily be rectangular in shape. The shape of the base and therefore of the tilt mirror should however take consideration of the fact that the array of the tilt mirror arrangements has a large packing density because this is one of the special advantages of the tilt mirror arrangement of the invention.

The tilt mirror arrangements arranged one next to the other must also not all be of the same size because the individual tilt mirror arrangements can be discretely controlled.

If for example, nonparallel beams (divergent or convergent) are used at a certain distance to each other, then a certain zoom effect can be obtained by means of a change of the spatial position of the reflecting surface in space. The position changing devices needed herefor can be configured in accordance with the state of the art.

It is understood that the foregoing description is that of the preferred embodiments of the invention and that various changes and modifications may be made thereto without departing from the spirit and scope of the invention as defined in the appended claims.

What is claimed is:

1. A tilt mirror arrangement comprising:

a base body defining a longitudinal axis;

a tilt mirror unit having a mirror defining a mirror surface extending transversely to said longitudinal axis;

a bearing defining at least an almost fixed pivot point between said tilt mirror unit and said base body for pivotally mounting said tilt mirror unit on said base body;

said tilt mirror unit having an outermost peripheral edge peripherally surrounding said mirror surface;

an actuator for tilting said mirror about an axis transverse to said longitudinal axis;

said actuator being mounted on said base body substantially entirely below said tilt mirror unit;

said tilt mirror unit, said bearing, said actuator and said base body conjointly defining an assembly which does not extend outwardly beyond said outermost peripheral edge when viewed in plan from above and along said longitudinal axis or extends only insignificantly beyond said outermost peripheral edge when said mirror is tilted and said assembly is viewed in plan from above and along said longitudinal axis.

2. The tilt mirror arrangement of claim 1, said bearing having a conical bearing surface and being self-centering with respect to said pivot point.

3. The tilt mirror arrangement of claim 1, said mirror surface having a diagonal measured in a direction perpendicular to said longitudinal axis and said diagonal being less than 15 mm and said base body having a diagonal of less than 15 mm measured in a direction perpendicular to said longitudinal axis.

4. The tilt mirror arrangement of claim 1, said tilt mirror unit having a tilt angle θ greater than 0.5°.

5. The tilt mirror arrangement of claim 1, said tilt mirror having a tilt angle θ and said arrangement further comprising a force-generating device for applying a changeable force to said tilt mirror unit to effect a change in said tilt angle θ when said force-generating device is driven externally.

6. The tilt mirror arrangement of claim 5, said tilt mirror unit having a lower end and an extension extending from said lower end; and, said force-generating device being mounted on said base body so as to act on said extension.

7. The tilt mirror arrangement of claim 6, said bearing defining a tilt axis about which said tilt mirror unit and said mirror tilt; and, said extension having a surface perpendicularly orientated relative to said tilt axis.

8. The tilt mirror arrangement of claim 7, said force-generating device being mounted laterally of said longitudinal axis and below said mirror.

9. The tilt mirror arrangement of claim 7, said tilt mirror unit having a lower end and said arrangement further comprising at least one tilt position detector mounted on said base body below said lower end of said tilt mirror unit; and, said tilt position detector being disposed laterally of said tilt axis.

10. The tilt mirror arrangement of claim 5, said tilt mirror unit having a lower end and a holder on said lower end; said force-generating device including an electromagnetic device for generating a magnetic field having a changeable magnetic field intensity; and, a magnet rigidly attached to said holder at the elevation of said electromagnetic device for interacting with said magnetic field to provide said changeable force.

11. The tilt mirror arrangement of claim 1, said bearing being a low-friction bearing.

12. The tilt mirror arrangement of claim 1, said mirror surface having a length greater than 1.5 mm.

13. The tilt mirror arrangement of claim 1, further comprising:

said mirror surface having a length measured across said surface which is less than 40 mm;

said base body having an upper region and said bearing being mounted in said upper region; and, a holding arrangement connecting said tilt mirror unit to said base body to prevent rotation of said tilt mirror unit about said longitudinal axis.

14. The tilt mirror arrangement of claim 1, wherein said mirror has a length measured across said surface which is less than 40 mm.

15. A tilt mirror arrangement comprising:

a base defining a longitudinal axis;

a tilt mirror unit having a mirror defining a mirror surface extending transversely to said longitudinal axis and having a length of less than 40 mm;

a bearing defining at least an almost fixed pivot point between said tilt mirror unit and said base for pivotally mounting said tilt mirror unit on said base;

said tilt mirror unit having an outermost peripheral edge peripherally surrounding said mirror surface;

said tilt mirror unit, said bearing and said base conjointly defining an assembly which does not extend outwardly beyond said outermost peripheral edge when viewed in plan from above and along said longitudinal axis or only insignificantly beyond said outermost peripheral edge when said mirror is tilted and said assembly is viewed in plan from above and along said longitudinal axis; and, a restraining device connected between said tilt mirror unit and said base.

16. The tilt mirror arrangement of claim 15, said restraining device being a spring.

17. A tilt mirror arrangement comprising:

a base defining a longitudinal axis;

a tilt mirror unit having a mirror defining a mirror surface extending transversely to said longitudinal axis and having a length of less than 40 mm;

a bearing defining at least an almost fixed pivot point between said tilt mirror unit and said base for pivotally mounting said tilt mirror unit on said base;

said tilt mirror unit having an outermost peripheral edge peripherally surrounding said mirror surface;

said tilt mirror unit, said bearing and said base conjointly defining an assembly which does not extend outwardly beyond said outermost peripheral edge when viewed in plan from above and along said longitudinal axis or only insignificantly beyond said outermost peripheral edge when said mirror is tilted and said assembly is viewed in plan from above and along said longitudinal axis;

said tilt mirror arrangement having a predetermined preferred inclined position; and, a weight-balancing device for acting on said tilt mirror unit.

18. A tilt mirror arrangement comprising:

a base defining a longitudinal axis;

a tilt mirror unit having a mirror defining a mirror surface extending transversely to said longitudinal axis and having a length of less than 40 mm;

a bearing defining at least an almost fixed pivot point between said tilt mirror unit and said base for pivotally mounting said tilt mirror unit on said base;

said tilt mirror unit having an outermost peripheral edge peripherally surrounding said mirror surface;

said tilt mirror unit, said bearing and said base conjointly defining an assembly which does not extend outwardly beyond said outermost peripheral edge when viewed in plan from above and along said longitudinal axis or only insignificantly beyond said outermost peripheral edge when said mirror is tilted and said assembly is viewed in plan from above and along said longitudinal axis;

said tilt mirror having a tilt angle $\theta$;

a force-generating device for applying a changeable force to said tilt mirror unit to effect a change in said tilt angle $\theta$ when said force-generating device is driven externally;

said tilt mirror unit having a lower end and an extension extending from said lower end;

said force-generating device being mounted on said base so as to act on said extension;

said bearing defining a tilt axis about which said tilt mirror unit and said mirror tilt;

said extension having a surface perpendicularly orientated relative to said tilt axis;

said force-generating device being mounted laterally of said longitudinal axis and below said mirror;

said force-generating device including a body bendable in a direction perpendicular to said tilt axis to generate said force;

said body having a lower end fixedly attached to said base; and, a mechanical coupling connecting said body to said tilt mirror unit for applying said force thereto.

19. The tilt mirror arrangement of claim 18, said body being a bending piezoactuator.

20. The tilt mirror arrangement of claim 19, said bending piezoactuator being a strip piezoactuator.

21. A tilt mirror arrangement comprising:

a base defining a longitudinal axis;

a tilt mirror unit having a mirror defining a mirror surface extending transversely to said longitudinal axis and having a length of less than 40 mm;

a bearing defining at least an almost fixed pivot point between said tilt mirror unit and said base for pivotally mounting said tilt mirror unit on said base;

said tilt mirror unit having an outermost peripheral edge peripherally surrounding said mirror surface;

said tilt mirror unit, said bearing and said base conjointly defining an assembly which does not extend outwardly beyond said outermost peripheral edge when viewed in plan from above and along said longitudinal axis or only insignificantly beyond said outermost peripheral edge when said mirror is tilted and said assembly is viewed in plan from above and along said longitudinal axis;

said tilt mirror unit having a lower side defining a center;

said base having a member extending therefrom to define a support extending to below said center;

said support having a top surface facing toward said lower side of said tilt mirror unit; and, said bearing including: a conical opening formed in said top surface and having an aperture angle $\beta$; and, a conical projection extending from said lower side and having a tip contact engaging said conical opening; and, said conical projection having an apex angle $\alpha$ less than said aperture angle $\beta$.

22. A tilt mirror array comprising:

a plurality of tilt mirror arrangements;

each of said tilt mirror arrangements including: a base defining a longitudinal axis; a tilt mirror unit having a mirror defining a mirror surface extending transversely to said longitudinal axis and having a length of less than 40 mm; a bearing defining at least an almost fixed pivot point between said tilt mirror unit and said base for pivotally mounting said tilt mirror unit on said base; said tilt mirror unit having an outermost peripheral edge peripherally surrounding said mirror surface; said tilt mirror unit, said bearing and said base conjointly defining an assembly which does not extend outwardly beyond said outermost peripheral edge when viewed in plan from above and along said longitudinal axis or only insignificantly beyond said outermost peripheral edge when said mirror is tilted and said assembly is viewed in plan from above and along said longitudinal axis; and, said plurality of tilt mirror arrangements being disposed one next to the other so as to cause the respective mirrors thereof to define said tilt mirror array.

23. The tilt mirror array of claim 22, said array of tilt mirrors being a first array and being so configured that a second array of said tilt mirrors can be placed directly adjacent said first array to define a composite array.

24. The tilt mirror array of claim 22, said plurality of tilt mirror arrangements being juxtaposed so as to define a hexagonal pattern of said mirrors.

25. The tilt mirror array of claim 22, said mirror surface having a length greater than 1.5 mm.

* * * * *